(12) United States Patent
Lin et al.

(10) Patent No.: US 9,128,677 B2
(45) Date of Patent: Sep. 8, 2015

(54) INPUT MODULE AND ELECTRONIC DEVICE HAVING THE SAME

(75) Inventors: Jao-Ching Lin, Taipei (TW); Jung-Shun Chang, Taipei (TW); Chih-Chieh Yu, Taipei (TW)

(73) Assignee: TOUCHSCREEN GESTURES, LLC, Dallas, TX (US)

( * ) Notice: Subject to any disclaimer, the term of this patent is extended or adjusted under 35 U.S.C. 154(b) by 408 days.

(21) Appl. No.: 12/875,505

(22) Filed: Sep. 3, 2010

(65) Prior Publication Data

US 2011/0309957 A1    Dec. 22, 2011

(30) Foreign Application Priority Data

Jun. 18, 2010 (TW) .............................. 99211638 U

(51) Int. Cl.
*H03K 17/94* (2006.01)
*G06F 1/16* (2006.01)
*G06F 3/02* (2006.01)

(52) U.S. Cl.
CPC .............. *G06F 1/169* (2013.01); *G06F 3/0202* (2013.01); *H01H 2239/074* (2013.01)

(58) Field of Classification Search
CPC ...................................................... G06F 1/169
USPC ..................................................... 341/20–23
See application file for complete search history.

(56) References Cited

U.S. PATENT DOCUMENTS

| | | | | |
|---|---|---|---|---|
| 4,491,702 A * | 1/1985 | Kato | ............................. | 200/5 A |
| 5,588,845 A * | 12/1996 | Naitoh et al. | .................. | 439/66 |
| 6,672,781 B1 * | 1/2004 | Takeda et al. | ................. | 400/491 |
| 7,164,088 B1 | 1/2007 | Yurochko et al. | | |
| 2003/0020694 A1 * | 1/2003 | Kim et al. | ...................... | 345/169 |
| 2003/0056278 A1 * | 3/2003 | Kuo et al. | .......................... | 2/160 |
| 2007/0029183 A1 * | 2/2007 | Hsu et al. | ...................... | 200/520 |
| 2007/0100252 A1 * | 5/2007 | Chou et al. | ..................... | 600/547 |
| 2007/0125628 A1 * | 6/2007 | Choi et al. | ..................... | 200/5 A |
| 2007/0139376 A1 * | 6/2007 | Giles | ............................. | 345/163 |
| 2008/0036627 A1 * | 2/2008 | Lim et al. | ........................ | 341/22 |
| 2008/0093961 A1 * | 4/2008 | Koyano et al. | .................. | 313/11 |
| 2009/0050464 A1 * | 2/2009 | Otani et al. | .................... | 200/6 A |
| 2009/0074255 A1 * | 3/2009 | Holm | ............................ | 382/115 |
| 2009/0103250 A1 * | 4/2009 | Takashima et al. | ....... | 361/679.02 |
| 2009/0157429 A1 * | 6/2009 | Lee et al. | ........................... | 705/3 |
| 2009/0195418 A1 * | 8/2009 | Oh | ................................... | 341/34 |
| 2009/0277766 A1 * | 11/2009 | Fujitsuna | ...................... | 200/342 |
| 2010/0264007 A1 * | 10/2010 | Jung et al. | ..................... | 200/516 |

* cited by examiner

*Primary Examiner* — Amine Benlagsir
(74) *Attorney, Agent, or Firm* — Bacon & Thomas, PLLC

(57) ABSTRACT

An input module includes a substrate, at least two bio-keys and a control unit. The substrate has at least two bio-leads and switches. Each of the bio-keys has a key surface, at least one conductive elastic piece and a protrusion. The conductive elastic piece is electrically connected and conducted to the key surface and the bio-leads. The control unit has an input-signal generating element and a biological-signal generating element. The input-signal generating element is configured to generate a first input signal and a second input signal by using the protrusion to toggle the switch. The biological-signal generating element is configured to generate a bioelectric signal through the electrical conduction between the bio-key and the bio-lead. The present invention further provides an electronic device, in which the bioelectric signal is analyzed by an operational unit to generate a biological function index.

19 Claims, 17 Drawing Sheets

INPUT MODULE AND ELECTRONIC DEVICE HAVING THE SAME

BACKGROUND OF THE INVENTION

1. Field of the Invention

The present invention relates to an input module, and in particular to an input module capable of generating bioelectric signals and key signals.

2. Description of Prior Art

Since many people pay more attention to keep their health, a biological-function monitoring system has become a necessity for modern people. Accordingly, various biological-function monitoring products are developed.

Taiwan Patent No. M567833 discloses a card type body fat meter, in which two electrodes are provided on a casing of the body fat meter to measure the body impedance between two fingers of a person to be tested, thereby measuring the body fat index of the person. However, in using such a body fat meter, the user needs to input his/her weight and height by an increment key or a decrement key. Furthermore, the monitoring software installed in this biological-function monitoring product is too simple that only the body fat ratio can be calculated.

According to the above, people pay more attention to the biological-function monitoring devices which are preferably activated by a simple operation. For example, the aforesaid card type body fat meter is different from the traditional bulky body fat meter in that the card type body fat meter can be carried by the user and operated with a common battery. Furthermore, Taiwan Patent No. M363898 discloses a portable physiological measurement device, in which physiological sensors are combined with a display unit, so that a user can directly read his/her physiological indexes on the display unit.

Although the current biological-function monitoring device has been made so compact for easy carry, such a device merely has one function, so that it cannot be used with other portable electronic products. If a sensor for measuring the bioelectric signals could be assembled with other electronic input device to integrate an input module with multiple input functions while the dimension and interface of the input module after combination are substantially equal to those before combination, a biological-function monitoring system can be successfully attached to a portable electronic product. With this arrangement, not only the function of the current portable electronic product is improved, but also the measurement of the biological functions of the user becomes more convenient.

SUMMARY OF THE INVENTION

In order to solve the above problems in prior art, an objective of the present invention is to provide an input module, which is capable of generating key signals and bioelectric signals.

Another objective of the present invention is to provide an electronic device capable of performing biological-function monitoring operation and key operations, and its performance can be improved based on the user's demand.

In order to achieve the above objectives, the present invention provides an input module including: a substrate, at least two bio-keys and a control unit. The substrate has at least two bio-leads and at least two switches. The bio-key has a key surface, at least one conductive elastic piece and a protrusion. The conductive elastic piece is electrically conducted to the key surface and the bio-leads. The protrusion is located at a position corresponding to the switch. The control unit has an input-signal generating element and a biological-signal generating element. The input-signal generating element is configured to generate a first input signal and a second input signal with the protrusion of the bio-key toggling the switch. When the two bio-keys are contacted by fingers, the biological-signal generating element is configured to generate a bioelectric signal through the electrical conduction between the bio-key and the bio-lead.

In order to achieve the above objectives, the present invention further provides an input module including: a substrate, at least two bio-keys and a control unit. The substrate has at least two bio-leads and at least two switches. The bio-key has a key surface, at least one conductive piece, an elastic piece and a protrusion. The elastic piece is connected to the key surface and the bio-lead. The bio-key is electrically conducted to the bio-lead. The protrusion is located at a position corresponding to the switch. The control unit has an input-signal generating element and a biological-signal generating element. The input-signal generating element is configured to generate a first input signal and a second input signal with the protrusion of the bio-key toggling the switch. When the two bio-keys are contacted by fingers, the biological-signal generating element is configured to generate a bioelectrical signal through the electrical conduction between the bio-key and the bio-lead.

In order to achieve the above objectives, the present invention provides an electronic device including: an input module, a control unit, an operational unit and a display unit. The input module has a substrate and at least two bio-keys. The substrate has at least two bio-leads and at least two switches. The bio-key has a key surface, at least one conductive elastic piece and a protrusion. The conductive elastic piece is electrically connected to the key surface and the bio-leads. The protrusion is located at a position corresponding to the switch. The control unit is electrically connected to the substrate and has an input-signal generating element and a biological-signal generating element.

The input-signal generating element is electrically connected to the switch and is configured to generate a first input signal and a second input signal with the protrusion of the bio-key toggling the switch. The biological-signal generating element is configured to drive the bio-lead to generate a bioelectric signal. The operational unit is electrically connected to the input-signal generating element and the biological-signal generating element. The operational unit is configured to analyze the bioelectric signal to generate at least one biological function index. The biological function index is displayed on the display unit, thereby performing the biological-function monitoring operation and the key operation. With this arrangement, the electronic device capable of performing the key operations can be integrated with an electronic device capable of performing the biological-function monitoring operation.

DETAILED DESCRIPTION OF THE INVENTION

The above-mentioned objectives, structural and functional features of the present invention will be described with reference to preferred embodiments thereof and the accompanying drawings.

Figure 1:
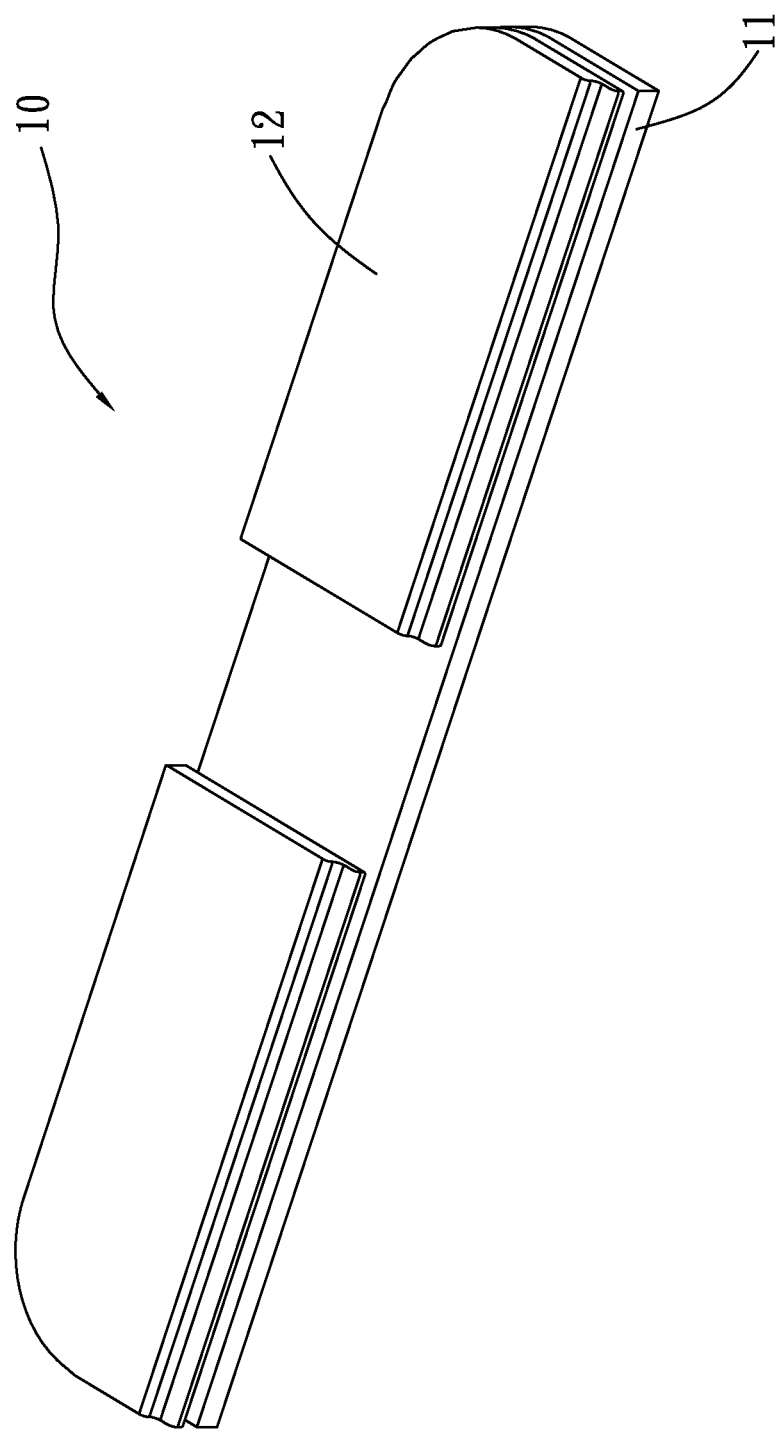
FIG. 1 is a perspective view showing an input module of the present invention.
Figure 2:
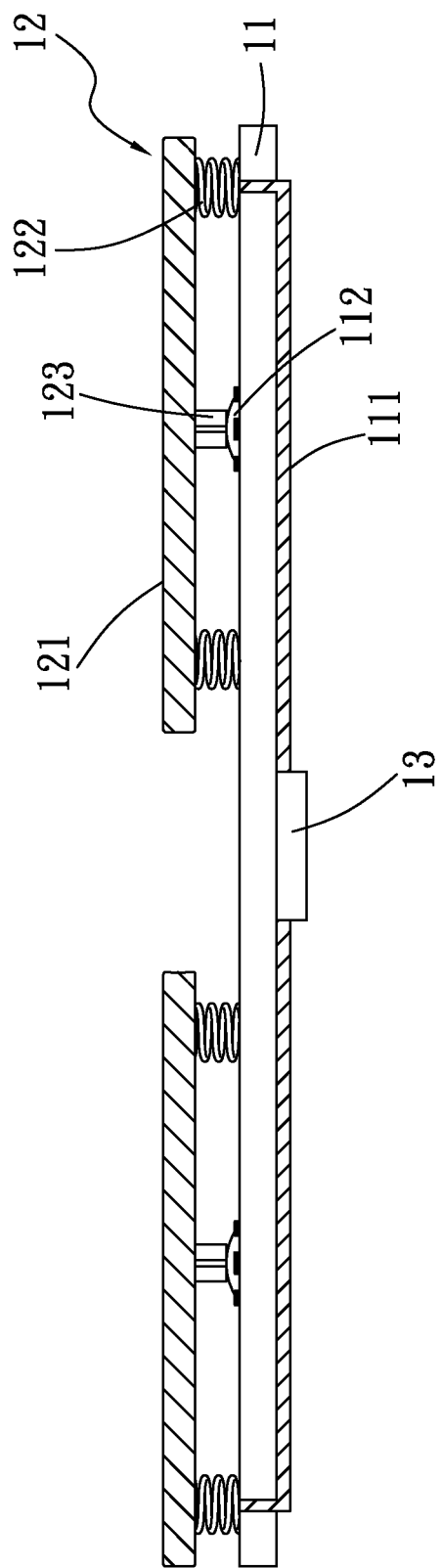
FIG. 2 is a cross-sectional view showing the input module of the present invention.
Figure 3:
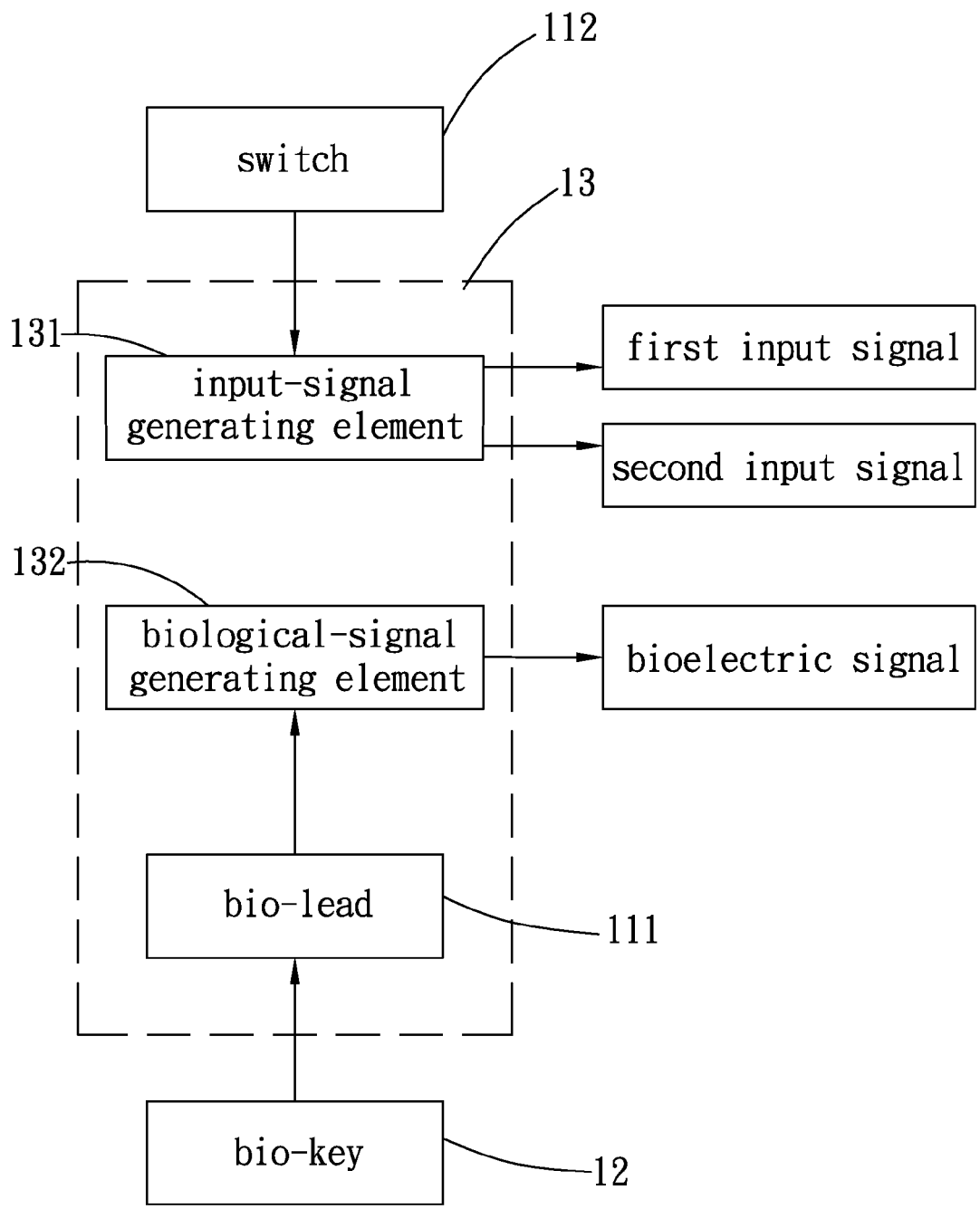
FIG. 3 is a block view showing the input module of the present invention.

Please refer to FIGS. 1 to 3. The present invention is directed to an input module 10. According to the present embodiment, the input module 10 includes a substrate 11, at least two bio-keys 12 and a control unit 13. The substrate 11 has at least two bio-leads 111 and at least two switches 112. Each of the bio-keys 12 is provided with a key surface 121. One side of the key surface 121 is electrically connected to one end of a conductive elastic piece 122. The other end of the conductive elastic piece 122 is electrically connected to the substrate 11 and electrically conducted to the bio-leads 111. The bio-key 12 is provided with a protrusion 123 below the key surface 121 at a position corresponding to the switch 112.

The control unit 13 has an input-signal generating element 131 and a biological-signal generating element 132. The input-signal generating element 131 is configured to generate a first input signal S1 and a second input signal S2 through the toggling of the switch 112. The biological-signal generating element 132 is configured to generate a bioelectric signal S3 through the electrical conduction between the bio-key 12 and the bio-lead 111.

Figure 4:
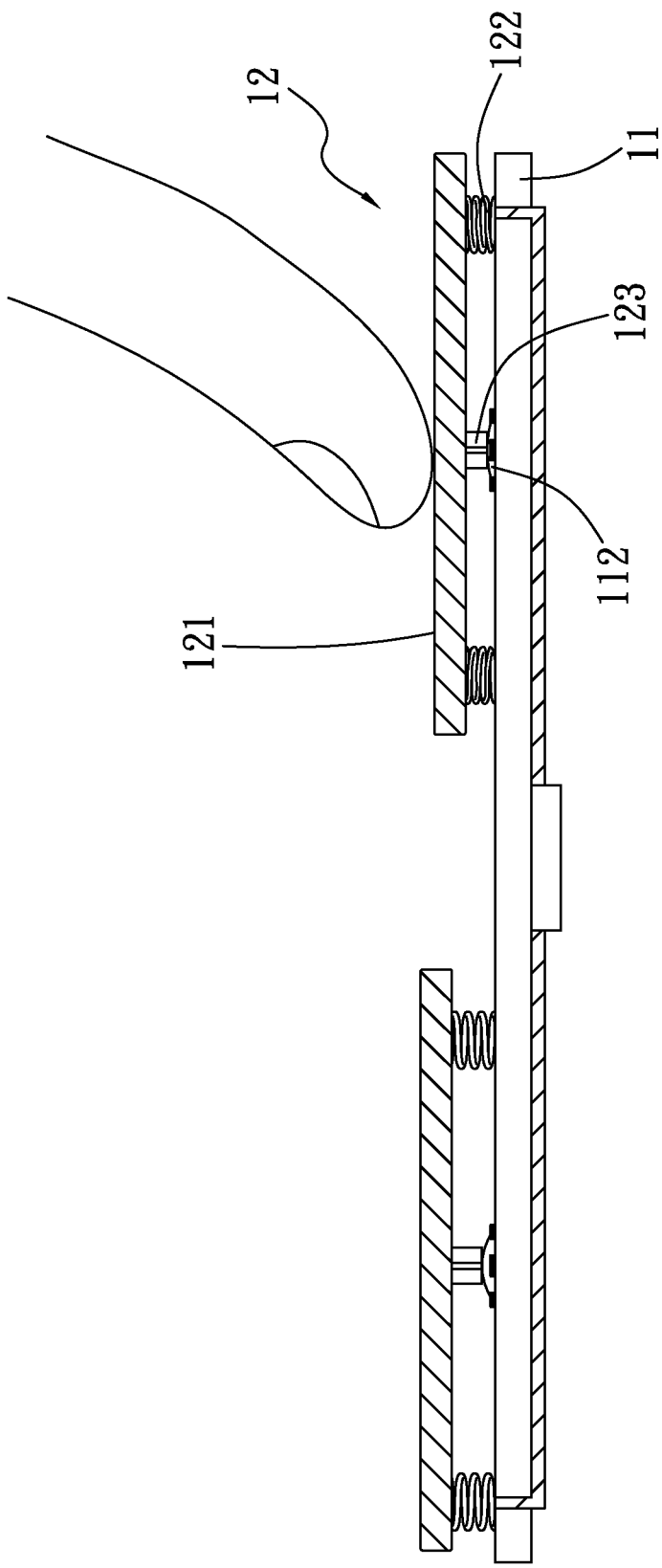
FIG. 4 is a schematic view (I) showing the operation of the input module of the present invention.

Please refer to FIGS. 3 and 4 again. The bio-key 12 of the input module 10 is configured to perform a command input operation or a biological-function monitoring operation based on demands. The key surface 121 of the bio-key 12 has characters, numerals or patterns for an input operation. When the input operation is performed, the user presses the key surface 121 of the bio-key 12. The key surface 121 is supported on the substrate 11 through the vertical movement of the conductive elastic piece 122 on one side of the key surface 121. The protrusion 123 on one side of the key surface 121 is configured to toggle the switch 112, whereby the input-signal generating element 131 can generate the first input signal S1 and the second input signal S2 and the steps of the input operation can be completed.

Figure 5A:
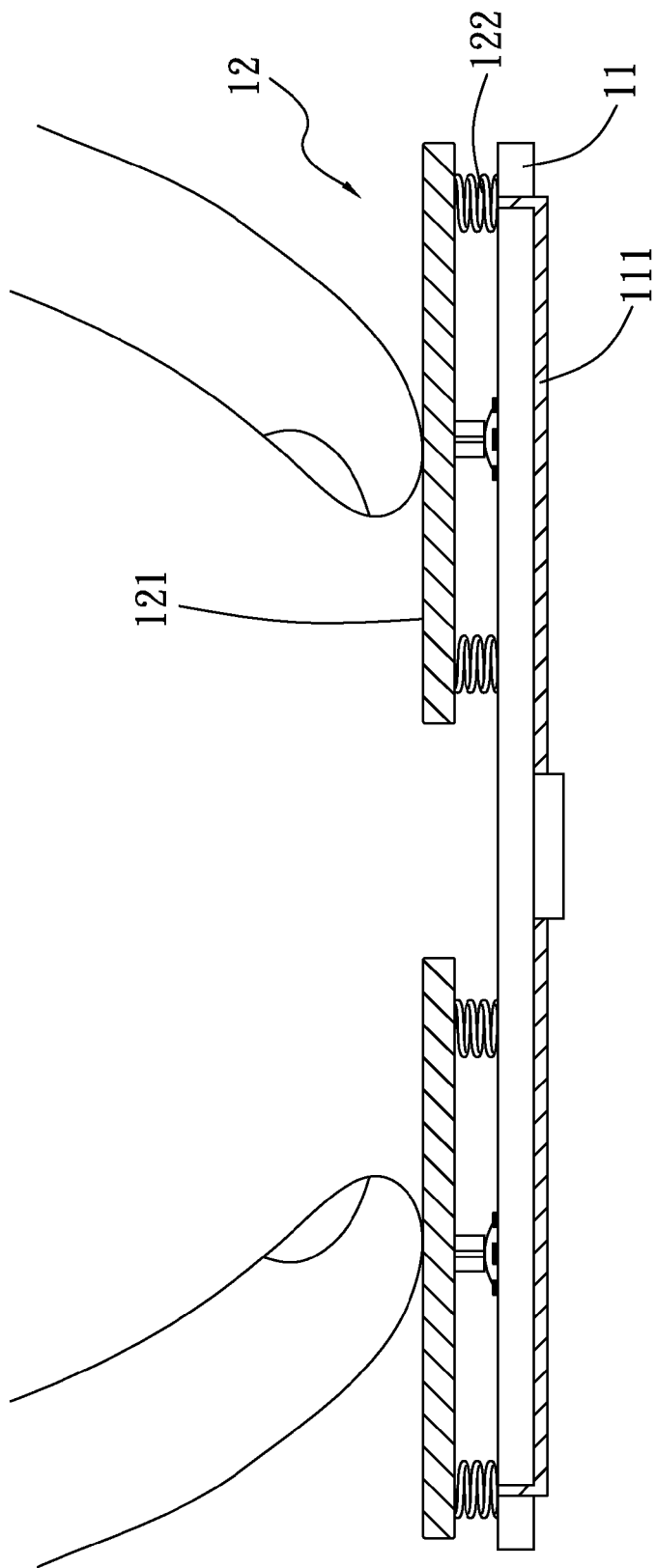
FIG. 5A is a schematic view (II) showing the operation of the input module of the present invention.
Figure 5B:
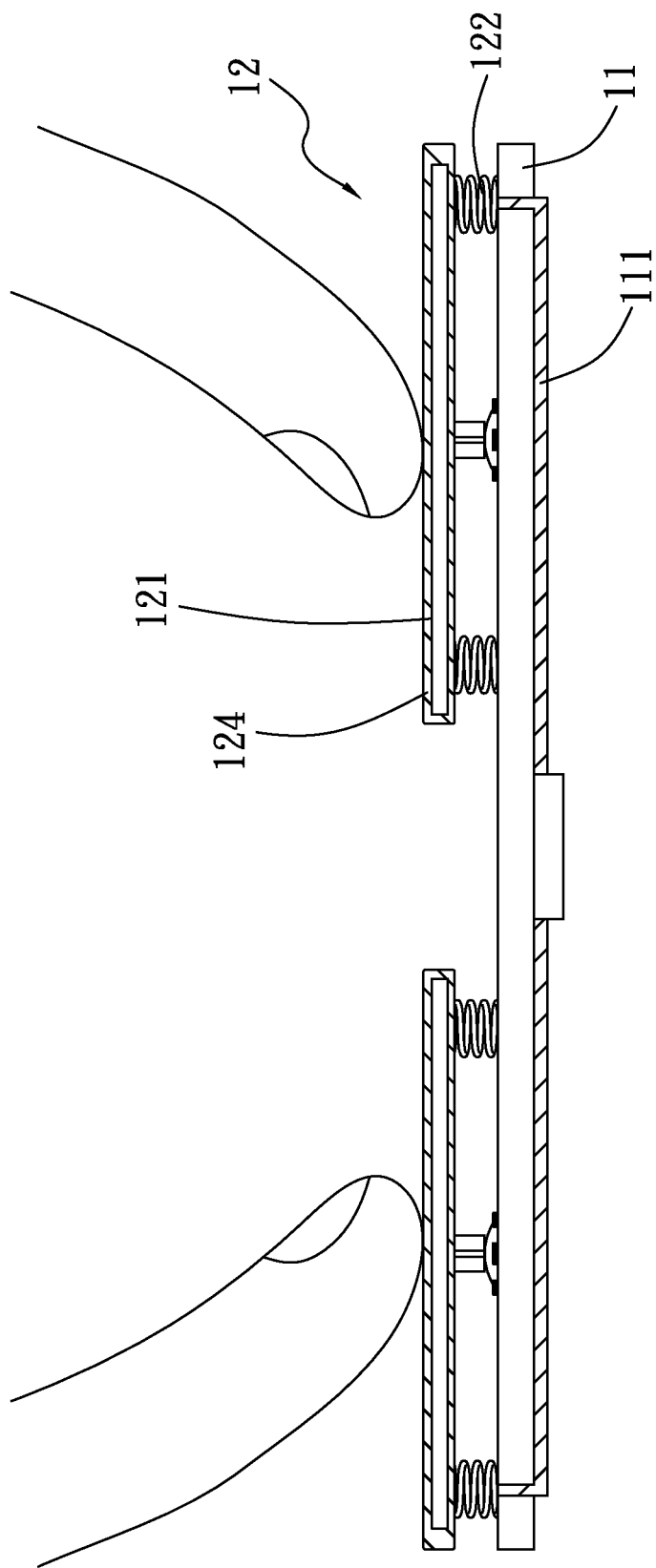
FIG. 5B is a schematic view (III) showing the operation of the input module of the present invention.

Please refer to FIGS. 3, 5A and 5B. The bio-key 12 may be made of electrical conductive materials or electrical non-conductive material. If the bio-key 12 is made of electrical conductive materials, the bio-key 12 can extend to be electrically conducted to the conductive elastic piece 122 (as shown in FIG. 5A). In the present embodiment, the bio-key 12 is made of electrical non-conductive material (as shown in FIG. 5B). The key surface 121 has an electrical conductive layer 124 extending to be electrically conducted to one end of the conductive elastic piece 122. Electrical conductive glue (not shown) may be applied between the electrical conductive layer 124 and the conductive elastic piece 122 for electrical conduction. The other end of the conductive elastic piece 122 is electrically connected to the substrate 11 and electrically conducted to the bio-lead 111. The biological-signal generating element 132 is configured to detect whether the at least two bio-keys 12 are contacted by fingers by using a first driving voltage to drive the bio-lead 111, so that the user can use the bio-key 12 of the input module 10 to perform a biological-function monitoring operation. In this operation, with the fingers touching the key surface 121 of one of the bio-keys 12, the biological-signal generating element 132 senses that two fingers are electrically connected to the conductive elastic piece 122 and the bio-leads 111 through the electrical conductive layer 124. Then, a second driving voltage is used to drive the bio-lead 111 to generate the bioelectric signals S3. In this way, the steps of the biological-function monitoring operation are completed.

The input module 10 may also have a switch mechanism. When the user intends to use the bio-keys 12 of the input module 10 to perform the biological-function monitoring operation, the protrusions 123 of the two bio-keys 12 are used to toggle the corresponding switches 112. The second driving voltage drives the bio-leads 111 to generate the bioelectric signal S3, thereby completing the biological-function monitoring operation. Alternatively, the input module 10 may be connected to an external host (not shown). The biological-signal generating element 132 is activated by the external host to drive the bio-leads 111 to thereby generate the bioelectric signal S3.

Figure 6A:
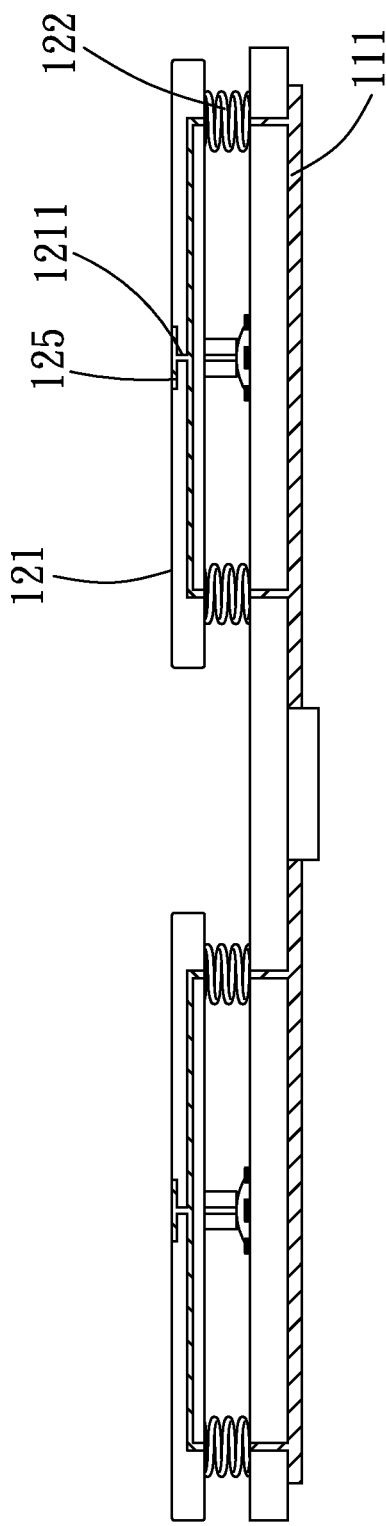
FIG. 6A is another cross-sectional schematic view (I) showing the input module of the present invention.
Figure 6B:
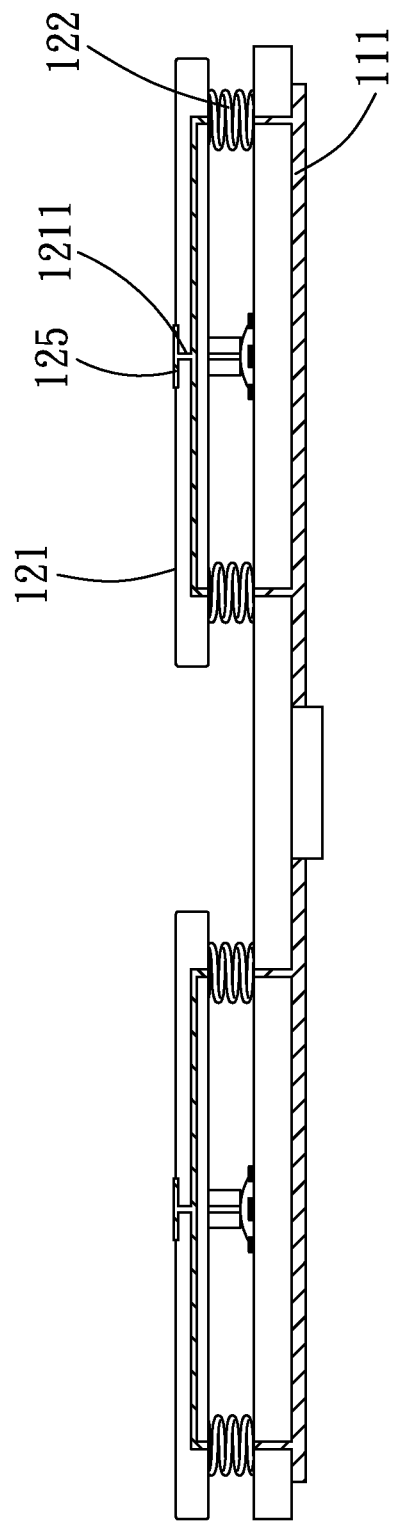
FIG. 6B is another cross-sectional schematic view (II) showing the input module of the present invention.
Figure 6C:
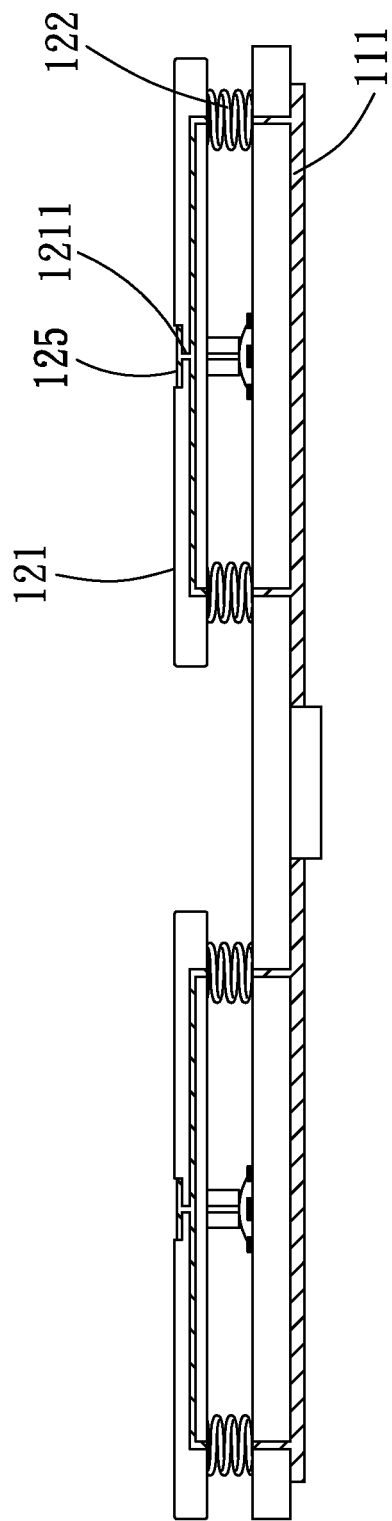
FIG. 6C is another cross-sectional schematic view (III) showing the input module of the present invention.
Figure 7:
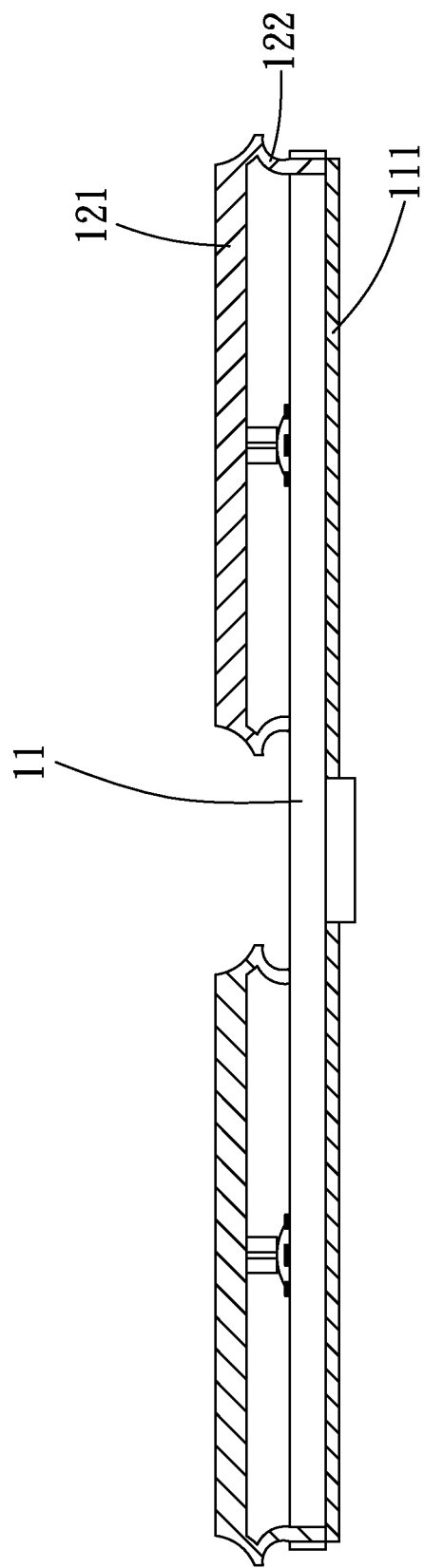
FIG. 7 is a further cross-sectional schematic view showing the input module of the present invention.

Please refer to FIGS. 6A, 6B and 6C. The key surface 121 is made of electrical non-conductive materials. The key surface 121 is provided with a through-hole 1211. The interior of the through-hole 1211 is provided with an electrode 125. One end of the electrode 125 extends to be connected with the conductive elastic piece 122. When two fingers touch the two key surfaces 121, the fingers contact the electrodes 125 to be electrically connected to the conductive elastic pieces 122 and the bio-leads 111. The electrode 125 is disposed through the through-hole 1211 and located at a position corresponding to the key surface 121. As shown in this figure, the other end of the electrode 125 may protrude from or recess in the key surface, or the other end of the electrode 125 extends to be parallel to the key surface. As shown in FIG. 7, the key surface 121 is made of electrical conductive materials. The key surface 121 may be integrally connected to the conductive elastic piece 122, so that the key surface 121 can be electrically connected to the conductive elastic piece 122 and the bio-lead 111. Further, the key surface 121 can be supported on the substrate 11 through the vertical movement of the conductive elastic piece 122.

Figure 8A:
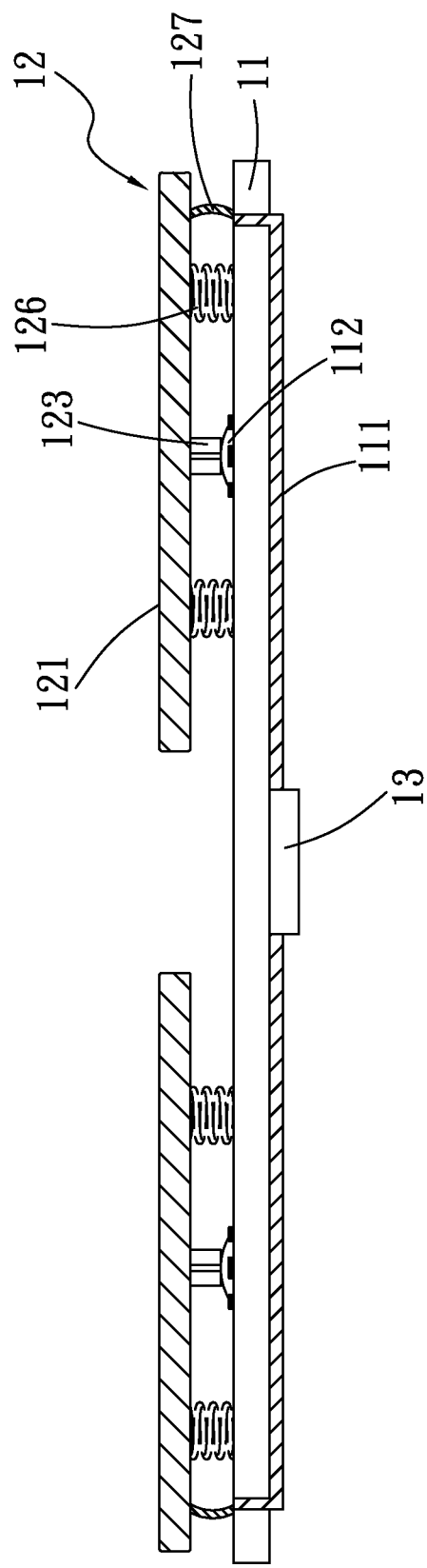
FIG. 8A is a cross-sectional schematic view (I) showing another input module of the present invention.
Figure 8B:
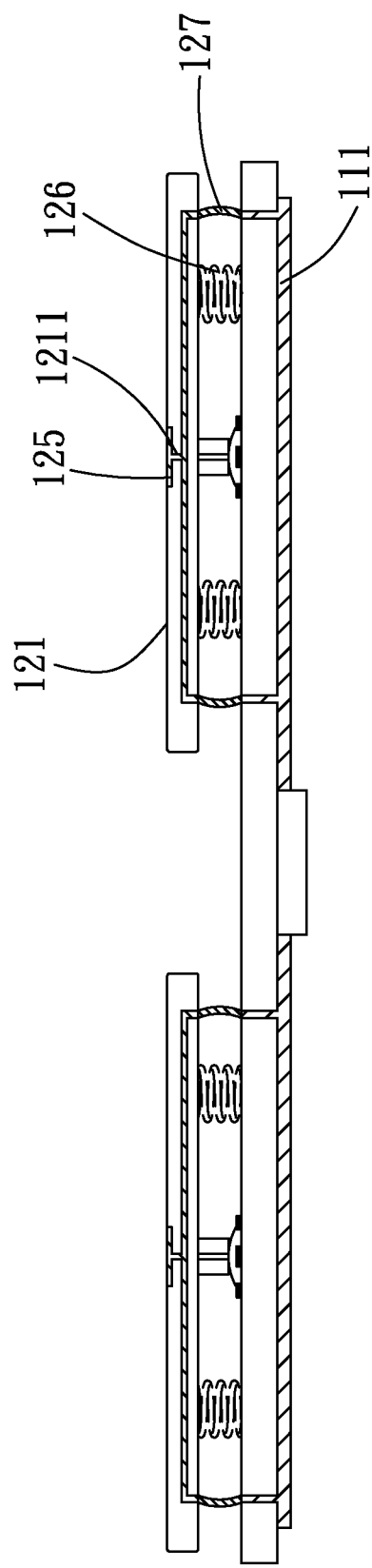
FIG. 8B is a cross-sectional schematic view (II) showing another input module of the present invention.

Please refer to FIG. 8A, which shows another preferred embodiment of the present invention. In the present embodiment, the whole structure and the relationship among the elements thereof are substantially the same as those in the previous embodiment, so that the redundant description is omitted for simplicity. The difference between the present embodiment and the previous embodiment lies in that: each of the bio-keys has the key surface 121, the protrusion 123, at least one elastic piece 126 and at least one electrical conductive piece 127. The elastic piece 126 is made of electrical non-conductive materials. One end of the elastic piece 126 is connected to the substrate 11, and the other end thereof is connected to the key surface 121. The bio-key 12 is provided with at least one electrical conductive piece 127 to be electrically conducted to the key surface 121 and the bio-lead 111. Electrical conductive glue (not shown) may be applied among the electrical conductive piece 127, the key surface 121 and the bio-lead 111 for electrical conduction. In operation, with the fingers touching the key surface 121 of one of the bio-keys 12, the biological-signal generating element 132 (as shown in FIG. 3) senses that two fingers are electrically connected to the conductive elastic piece 127 and the bio-leads 111 through the key surface 121. In this way, the steps of the biological-function monitoring operation are completed. As shown in FIG. 8B, as mentioned in the above, the key surface 121 is made of electrical non-conductive materials. The key surface 121 is provided with a through-hole 1211 and the electrode 125 is disposed in the through-hole 1211. One end of the electrode 125 extends to be connected to the electrical conductive piece 127, thereby completing the steps of the biological-function monitoring operation.

Figure 9:
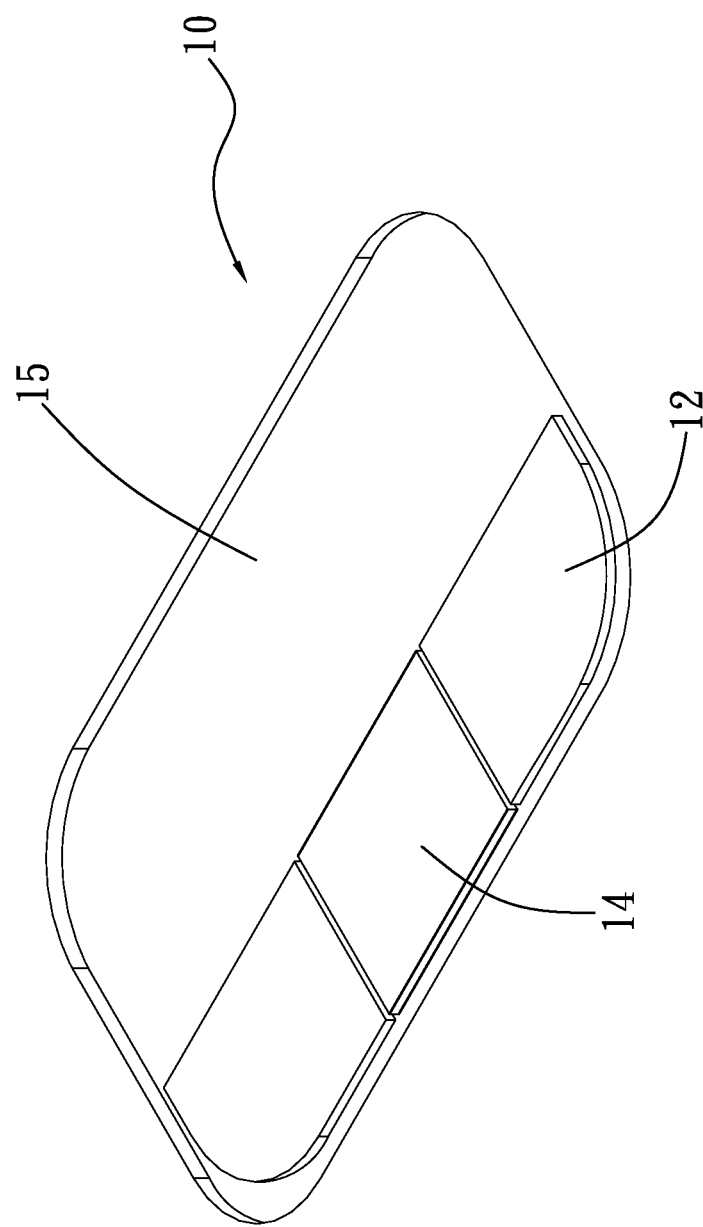
FIG. 9 is a schematic view showing the operation of the input module of the present invention.
Figure 10A:
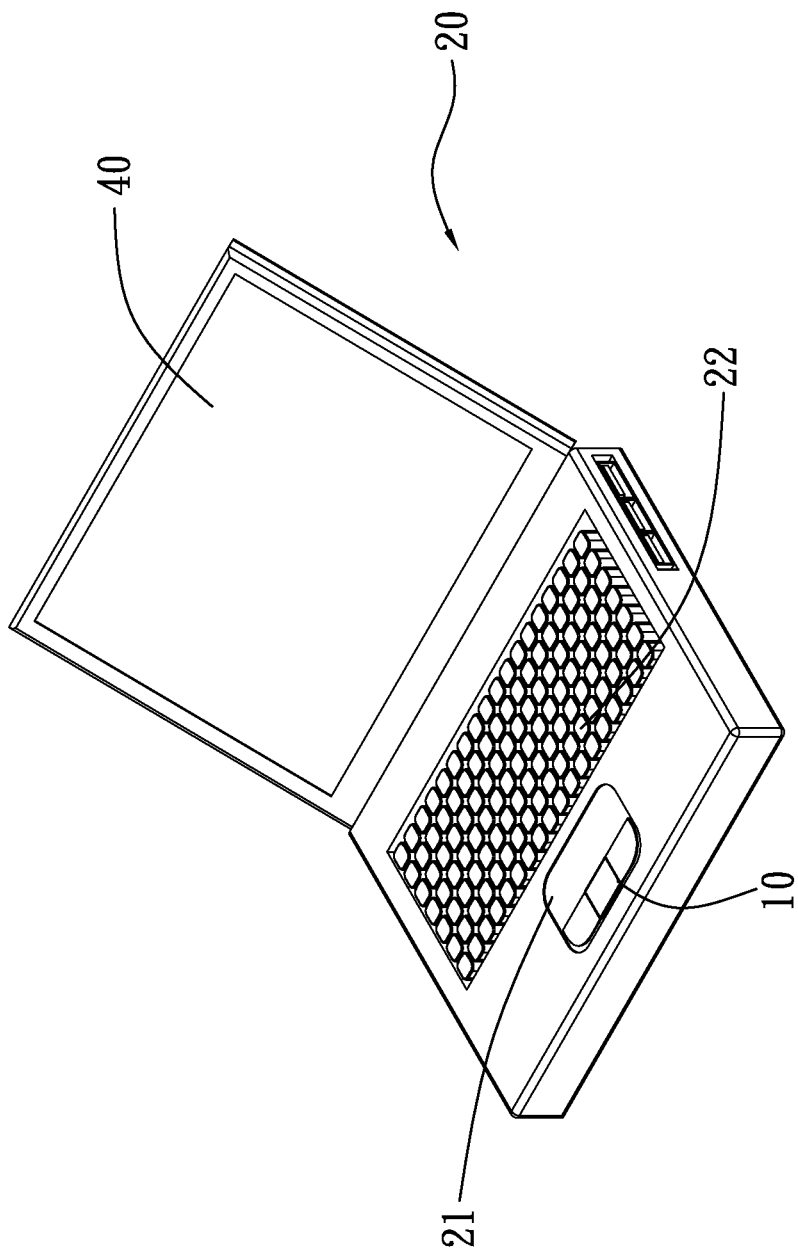
FIG. 10A is a perspective view (I) showing an electronic device of the present invention.
Figure 10B:
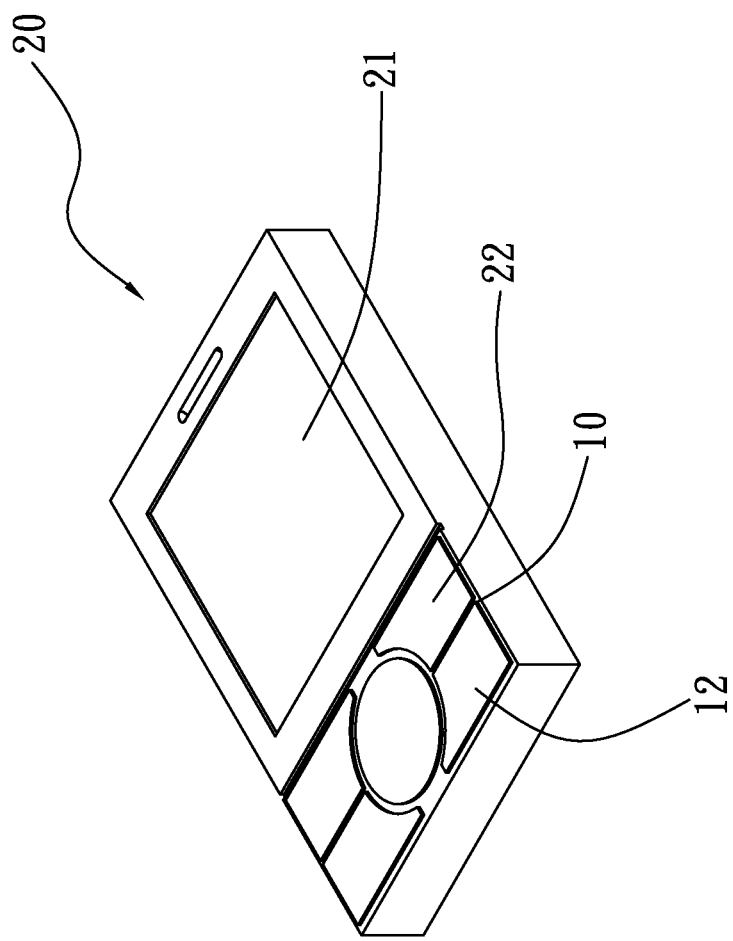
FIG. 10B is a perspective view (II) showing the electronic device of the present invention.
Figure 10C:
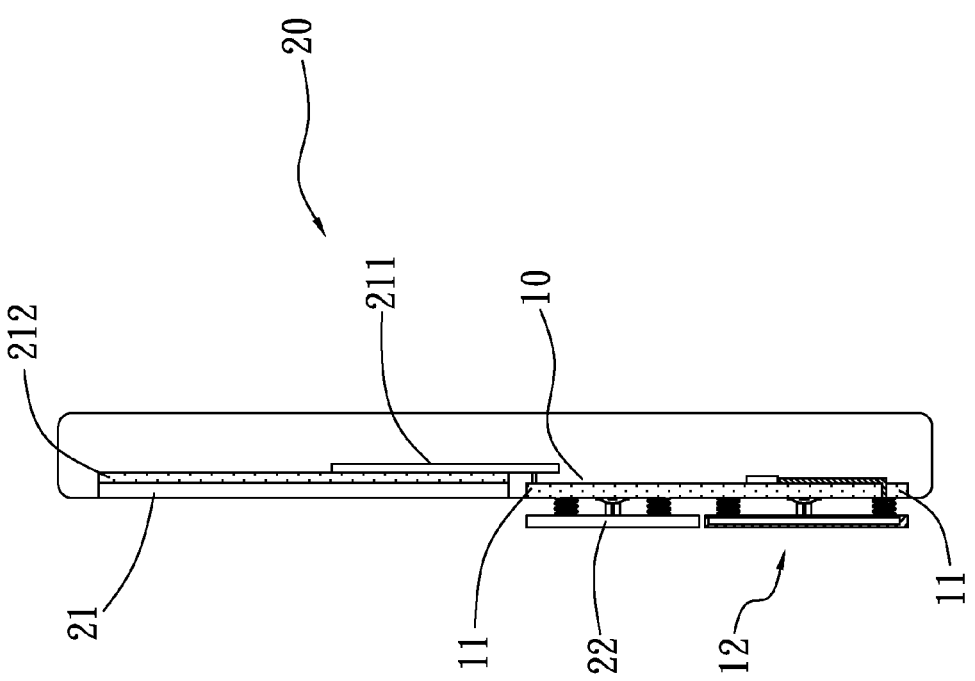
FIG. 10C is a cross-sectional view showing the electronic device of the present invention.
Figure 11:
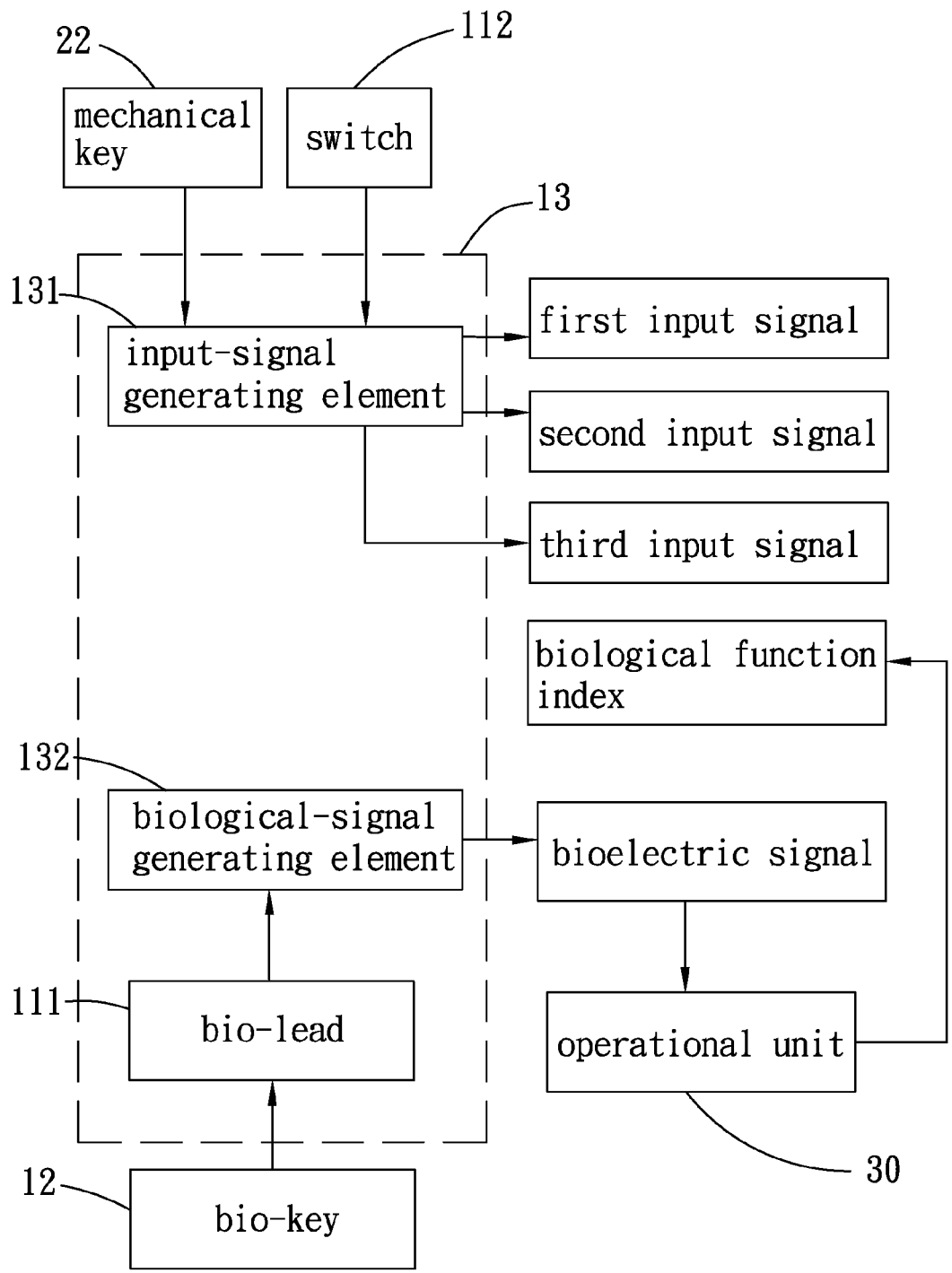
FIG. 11 is a block view showing the electronic device of the present invention.

As shown in FIGS. 3 and 9, the input module 10 may be arranged with at least one mechanical key 14 and at least one touch pad 15, thereby simulating an operating interface of a notebook computer. With the input-signal generating element 131 generating a first input signal S1 and a second input signal S2 through the toggling of the switches 112, the two bio-keys 12 can simulate a left key and a right key of a mouse.

Please refer to FIGS. 10A, 10B, 10C and 11, which show an electronic device 20 according to a preferred embodiment of the present invention. The electronic device 20 comprises the input module 10, the control unit 13, an operational unit 30 and a display unit 40. The input module 10 includes the substrate 11 and at least two bio-keys 12. The control unit 13 may be fitted with the electronic device 20 or the input module 10. In the present embodiment, the control unit 13 is fitted with the electronic device 20. The control unit 13 is electrically connected to the substrate 11 and has an input-signal generating element 131 and a biological-signal generating element 132. The input-signal generating element 131 is electrically connected to the switch 112, thereby generating a first input signal S1 and a second input signal S2 through the toggling of the switch 112. The biological-signal generating element 132 is driven by the bio-lead 111 to generate a bioelectric signal S3. The biological-signal generating element 132 is electrically connected to the operational unit 30 and transmits the bioelectric signal S3 to the operational unit 30 for processing. The operational unit 30 includes a memory region (not shown) and operational programs stored in the memory region. Thus, with the operational programs analyzing the bioelectric signal S3, the operational unit 30 generates at least one biological function index S5 to be displayed on the display unit 40.

In this way, the user can use the electronic device 20 to perform the steps of the biological-function monitoring operation.

The electronic device 20 further includes a touch surface 21 and a plurality of mechanical keys 22. The touch surface 21 and the mechanical keys 22 are electrically connected to the input-signal generating element 131. The touch surface 21 is made of light-transmitting materials and provided above the display unit 30. The bio-key 12 is disposed around the touch surface 21. The user presses the bio-key 12 in such a manner that the input-signal generating element 131 can individually generate the first input signal S1 and the second input signal S2. The plurality of mechanical keys 22 is used to generate a plurality of third input signals S4. The first input signal Si is used to simulate an input signal generated by a right key of the mouse, and the second input signal S2 is used to simulate an input signal generated by a left key of the mouse. With this arrangement, the electronic device 20 can perform the key operation and the biological-function monitoring operation simultaneously without changing the dimension and interface of the electronic device 20.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An input module, including:
   a substrate having at least two bio-leads disposed at one side of the substrate and at least two switches disposed at another side of the substrate;
   at least two bio-keys;
   wherein each bio-key of the at least two bio-keys having a key surface, at least one conductive elastic piece and a protrusion,
   wherein one end of the conductive elastic piece being electrically connected and conducted to the key surface, another end of the conductive elastic piece being electrically connected to the substrate and conducted to the at least two bio-leads, the protrusion being located below the key surface at a position to a corresponding switch of the at least two switches; and
   a control unit having an input-signal generating element and a biological-signal generating element, the input-signal generating element generates a first input signal and a second input signal through a toggling of the corresponding switch of the at least two switches, the biological-signal generating element generates a bioelectric signal through an electrical conduction between said each bio-key of the at least two bio-keys and a corresponding bio-lead of the at least two bio-leads, wherein the biological-signal generating element drives the corresponding bio-lead of the at least two bio-leads to generate the bioelectric signal when electrical-conductive layers of the at least two bio-keys are simultaneously contacted by fingers and in response to the at least two switches being activated by corresponding protrusions of the at least two bio-keys;
   wherein the key surface is made of electrical non-conductive materials, the key surface is provided with a through-hole, an electrode is disposed in the through-hole, one end of the electrode extends to be connected with the conductive elastic piece, and wherein another end of the electrode protrudes from or recesses in the key surface, or the electrode extends to be parallel to the key surface.

2. The input module according to claim 1, wherein the key surface further having an electrical conductive layer of the electrical-conductive layers extending to be electrically conducted to the conductive elastic piece, and the key surface is electrically connected to the corresponding bio-lead of the at least two bio-leads for producing an electrical connection between the corresponding bio-lead of the at least two bio-leads and a user's finger.

3. The input module according to claim 2, wherein the biological-signal generating element further drives the at least two bio-leads through a first driving voltage and further detects whether the at least two bio-keys are contacted by the fingers or not, the biological-signal generating element further drives the at least two bio-lead to generate the bioelectric signal through a second driving voltage when the at least two bio-keys are contacted by the fingers.

4. The input module according to claim 1, wherein the key surface is supported on the substrate by the conductive elastic piece to thereby move vertically on the substrate, and the protrusion toggles the corresponding switch of the at least two switches when the key surface moves vertically on the substrate.

5. The input module according to claim 1, wherein the key surface is further made of electrical conductive materials.

6. The input module according to claim 1, wherein the input module is connected to an external host, the biological-signal generating element is activated by the external host to drive the corresponding bio-lead of the at least two bio-leads to thereby generate the bioelectric signal.

7. The input module according to claim 1, further including at least one mechanical key.

8. The input module according to claim 1, further including at least one touch pad.

9. The input module according to claim 1, wherein the first input signal is used to simulate an input signal generated by a right key of a mouse, the second input signal is used to simulate an input signal generated by a left key of the mouse.

10. An input module, including:
a substrate having at least two bio-leads disposed at one side of the substrate and at least two switches disposed at another side of the substrate;
at least two bio-keys;
wherein each bio-key of the at least two bio-keys having a key surface, at least one elastic piece, at least one electrical conductive piece and a protrusion,
wherein one end of the elastic piece being connected to the key surface, another end of the elastic piece being connected to the substrate, said each bio-key being electrically conducted to a corresponding bio-lead of the at least two bio-leads through the electrical conductive piece, and the protrusion being located below the key surface at a position to a corresponding switch of the at least two switches; and
a control unit having an input-signal generating element and a biological-signal generating element, the input-signal generating element generates a first input signal and a second input signal through a toggling of the corresponding switch of the at least two switches, the biological-signal generating element generates a bioelectric signal through an electrical conduction between said each bio-key and the corresponding bio-lead of the at least two bio-leads, wherein the biological-signal generating element drives the at least two bio-leads to generate the bioelectric signal when electrical-conductive layers of the at least two bio-keys are simultaneously contacted by fingers and in response to the at least two switches being activated by corresponding protrusions of the at least two bio-keys;
wherein the key surface is made of electrical non-conductive materials, the key surface is provided with a through-hole, an electrode is disposed in the through-hole, one end of the electrode extends to be connected with the elastic piece, another end of the electrode protrudes from or recesses in the key surface, or the electrode extends to be parallel to the key surface.

11. The input module according to claim 10, wherein the key surface further having an electrical conductive layer of the electrical-conductive layers extending to be electrically conducted to the electrical conductive piece, and the key surface is electrically connected to the corresponding bio-lead of the at least two bio-leads for producing an electrical connection between the corresponding bio-lead of the at least two bio-leads and a user's finger.

12. The input module according to claim 11, wherein the biological-signal generating element further drives the corresponding bio-lead of the at least two bio-leads through a first driving voltage and detects whether the at least two bio-keys are contacted by the fingers or not, the biological-signal generating element further drives the corresponding bio-lead of the at least two bio-leads to generate the bioelectric signal through a second driving voltage when the at least two bio-keys are contacted by the fingers.

13. The input module according to claim 10, wherein the key surface is supported on the substrate by the elastic piece to thereby move vertically on the substrate, and the protrusion toggles the corresponding switch of the at least two switches when the key surface moves vertically on the substrate.

14. The input module according to claim 10, wherein the key surface is further made of electrical conductive materials.

15. An electronic device, including:
an input module having a substrate and at least two bio-keys,
wherein the substrate having at least two bio-leads disposed at one side of the substrate and at least two switches disposed at another side of the substrate,
each bio-key of the at least two bio-keys has a key surface, at least one conductive elastic piece and a protrusion,
wherein one end of the conductive elastic piece being electrically connected and conducted to the key surface, another end of the conductive elastic piece being connected to the substrate and conducted to the at least two bio-leads, the protrusion being located below the key surface at a position to a corresponding switch of the at least two switches;
a control unit electrically connected to the substrate and having an input-signal generating element and a biological-signal generating element, the input-signal generating element generates a first input signal and a second input signal through a toggling of the corresponding switch of the at least two switches, the biological-signal generating element generates a bioelectric signal through an electrical conduction between said each bio-key of the at least two bio-keys and a corresponding bio-lead of the at least two bio-leads, wherein the biological-signal generating element drives the at least two bio-leads to generate the bioelectric signal when electrical-conductive layers of the at least two bio-keys are simultaneously contacted by fingers and in response to the at least two switches being activated by corresponding protrusions of the at least two bio-keys; and
an operational unit electrically connected to the biological-signal generating element, the operational unit analyzes the bioelectric signal to thereby generate at least one biological function index; and a display unit displays the biological function index;
wherein the key surface is made of electrical non-conductive materials, the key surface is provided with a through-hole, an electrode is disposed in the through-hole, one end of the electrode extends to be connected with the conductive elastic piece, another end of the electrode protrudes from or recesses in the key surface, or the electrode extends to be parallel to the key surface.

16. The electronic device according to claim 15, further including a touch surface connected to the control unit, said each bio-key of the at least two bio-keys is disposed around the touch surface, said each bio-key of the at least two bio-keys is pressed to generate the first input signal and the second input signal.

17. The electronic device according to claim 16, wherein the first input signal is used to simulate an input signal generated by a right key of a mouse, the second input signal is used to simulate an input signal generated by a left key of the mouse.

18. The electronic device according to claim 15, further including a plurality of mechanical keys connected to the control unit to generate a plurality of third input signals.

19. The electronic device according to claim 15, wherein the operational unit further includes a memory region and operational programs stored in the memory region.

* * * * *